3,318,866
PROCESS FOR MAKING PARTIAL O-ACYLATES
OF LINCOMYCIN
Herman Hoeksema, Cooper Township, Kalamazoo County, Mich., assignor to The Upjohn Company, Kalamazoo, Mich., a corporation of Delaware
No Drawing. Filed Apr. 13, 1964, Ser. No. 359,465
5 Claims. (Cl. 260—210)

ABSTRACT OF THE DISCLOSURE

Process for making partial O-acylates of lincomycin by acylating lincomycin to the next higher O-acylate and then subjecting the same to acid hydrolysis for a time sufficient to effect hydrolysis to the desired O-acylate. The lincomycin partial O-acylates are useful as intermediates to make antibiotic compounds.

This invention relates to novel processes and is particularly directed to novel processes for making partial O-acylates of lincomycin. More particularly, this invention relates to the production of partial O-acylates of lincomycin in which the next higher O-acylate is subjected to acid hydrolysis for time sufficient to effect substantial hydrolysis of the starting O-acylate to the desired partial O-acylate and then isolating the desired O-acylate from the reaction mixture. Still more particularly, the invention pertains to processes in which lincomycin is acylated to the tetra-O-acylate stage, then subjected to hydrolysis to effect substantial hydrolysis of the tetra-O-acylate to the tri-O-acylate, and the tri-O-acylate separated from the reaction mixture.

Lincomycin is an antibiotic obtained as an elaboration product of a lincomycin-producing actinomycete. Methods for the production, recovery, and purification of lincomycin are described in U.S. Patent 3,086,912. Lincomycin contains four hydroxyl groups which can react with acylating agents, for example, acid chlorides and acid anhydrides, to form O-acylates. Depending upon the degree of acylation, mono-, di-, tri-, and tetra-O-acylates are formed. Under conditions of complete or exhaustive acylation the tetra-O-acylate is obtained. Under less rigorous acylating conditions mixtures of mono, di, tri, and tetra acylates are obtained. The partial O-acylates, that is, mono, di, and tri-O-acylates, are thus always obtained in admixture with each other and with tetra-O-acylate. Separate recovery of any particular partial O-acylate, for example, the mono-, di-, or tri-O-acylate, requires a difficult separation. Moreover when any particular partial O-acylate is desired the yields are poor by this method because of the concomitant production of other partial O-acylates and tetra-O-acylates.

It has now been found in accordance with this invention that partial O-acylates can be obtained more simply and effectively by first preparing the next higher O-acylate and subjecting it to acidic hydrolysis until substantial hydrolysis to the desired partial O-acylate is obtained. This process is particularly applicable to the production of tri-O-acylates in that the tetra-O-acylate is simply and easily prepared by direct acylation of lincomycin with a suitable acylating agent, for example, an acid halide or anhydride, and is simply and easily hydrolyzed to give a hydrolysate essentially free of tetra-O-acylates in which the tri-O-acylate is the predominate constituent. Separation of the tri-O-acylate from the hydrolysate is relatively simple because of the high concentration of the tri-O-acylate therein. Moreover, the yields are substantially higher because less of the lincomycin is converted to by-product acylates, such as, the tetra-, di-, and mono-acylates. The process of the invention also contemplates subjecting the tri-O-acylate to acidic hydrolysis to convert it substantially to the di-O-acylate and separating the di-O-acylate from the hydrolysate, and if desired, the mono-O-acylates from the remaining fraction. The di-O-acylates thus obtained can also be subjected to acidic hydrolysis to the mono-O-acylates but ordinarily this is neither necessary nor desirable because the hydrolysate of the tri-O-acylate can readily be separated into the di- and mono-O-acylate fractions.

In carrying out the processes of the invention, lincomycin is first fully acylated to the tetra-O-acylate stage. Any acylating agent capable of effecting O-acylation can be used for this purpose. Ordinarily it will be sufficient simply to react the lincomycin with an acid halide or acid anhydride under acylating conditions until complete acylation is obtained. Thus, when lincomycin is treated under acylating conditions with at least a stoichiometric amount of acylating agent, advantageously in the presence of an acid-binding agent, the tetra-O-acylate is obtained. Ordinarily, an excess, that is, more than 4 moles of acylating agent, is used in order to insure that all of the lincomycin is fully acylated to the tetra-O-acylate. Advantageously, a 10 to 50 fold excess can be used. The reaction is effected in a convenient manner by mixing lincomycin, an acid binding agent, and an acylating agent at room temperature and heating the resulting mixture, if desired, until the reaction is complete. Temperatures ranging from about 30 to about 80° C. can be used effectively. Higher and lower temperatures can be used also, but higher temperatures tend toward decomposition and lower temperatures toward excessively long reaction time.

The tetra-O-acylate is then subjected to acid hydrolysis until substantial conversion of the tetra-O-acylate to the tri-O-acylate is obtained. The lincomycin tetra-O-acylate is contacted with a dilute aqueous acid solution substantially at room temperature until the desired degree of hydrolysis is obtained. Under mild conditions, for example, using a dilute acid, say, from about 0.1 N to about 1 N and a low temperature, say, between about 15 and 50° C., effective conversion of the tetra-O-acylate to a tri-O-acylate is obtained. Ordinarily, not more than from about 1 to 5 hours is needed to effect the desired hydrolysis. Shorter times are undesirable as they leave too much tetra-O-acylate in this hydrolysate and longer times are undesirable because of the tendency toward the production of excessive amounts of the mono- and di-O-acylates. Any nonreactive acid, especially the strong mineral acids, such as hydrochloric, sulfuric, and phosphoric acids can be used. If desired, a small amount, say from about 10 to 50% by volume, of water-miscible solvent for example, a loweralkanol, such as methanol, and ethanol, a lower alkanone, such as, acetone or methyl ethyl ketone can be incorporated in the hydrolyzing solution.

The tri-O-acylates thus obtained can be isolated from the hydrolysate by conventional procedures, for example, crystallization, extraction, and chromatography. Frictional liquid-liquid extraction techniques, for example, countercurrent distribution is particularly effective because of the different $k$ values of the tri-O-acylates and the mono- and di-O-acylates.

The tri-O-acylates thus formed, preferably after isolation from the hydrolysate, can be subjected to further hydrolysis to convert the tri-O-acylate to the di-O-acylate. The di-O-acylate can be recovered from the resulting hydrolysate by the usual isolation procedures referred to above, advantageously, by fractional liquid-liquid extraction because of different $k$ values of the different O-acylates.

Suitable acid binding agents for carrying out the processes of the invention include tertiary nitrogenous bases, for example, pyridine, quinoline, isoquinoline; trialkylamines, such as trimethylamine, triethylamine, triisopropylamine, and the like; N,N'-dialkylanilines, such as dimethylaniline, diethylaniline, and the like; and N-alkylpiperidines, such as N-ethylpiperidine, N-methylpiperidine, and the like. Anion exchange resins can also be used for this purpose.

In carrying out the processes of the invention any acylating agent capable of effecting O-acylation can be used. The invention is not limited to any particular type of acylating agents or to any particular type of acylating processes, but includes carboxylic acid type acylating agents, sulfonic type acylating agents, and the like. It includes such processes as acylating with acid anhydrides and acid halides, transesterification, and like acylating procedures. All that is required in carrying out the process of the invention is that lincomycin first be fully acylated to the tetra-O-acylate, and that the tetra-O-acylate so obtained be then subjected to acid hydrolysis until substantial conversion of the tetra-O-acylate to the tri-O-acylate is obtained.

Illustrative of the type of acylating agents that can be used in the processes of the invention are the anhydrides and acid chlorides of hydrocarboncarboxylic acids, especially those containing not more than 12 carbon atoms, as well as the halo-, nitro-, hydroxy-, amino-, cyano-, thiocyano-, and loweralkoxy-hydrocarboncarboxylic acids, also especially those containing not more than 12 carbon atoms, alkanesulfonic acids, especially the lower alkane sulfonic acids, such as methane sulfonic acid, and aromatic sulfonic acids, especially those of the benzene series, such as benzene sulfonic acid and the toluene sulfonic acids.

Suitable hydrocarbon carboxylic acids of not more than 12 carbon atoms include (a) saturated or unsaturated, straight or branched chain aliphatic carboxylic acids, for example, acetic, propionic, butyric, isobutyric, tertbutylacetic, valeric, isovaleric, caproic, caprylic, decanoic, dodecanoic, acrylic, crotonic, undecylenic, hexynoic, heptynoic, octynoic acids, and the like; (b) saturated or unsaturated alicyclic carboxylic acids, for example, cyclobutanecarboxylic acid, cyclopentane carboxylic acid, cyclopentenecarboxyic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated substituted alicyclic aliphatic carboxylic acids, for example, cyclopentaneacetic acid, cyclopentanepropionic acid, cyclopenteneacetic acid, cyclohexanebutyric acid, methylcyclohexaneacetic acid, and the like; and (d) aromatic-aliphatic carboxylic acids, for example, phenylacetic acid, phenylpropionic acid, phenylvaleric acid, cinnamic acid, phenylpropiolic acid, and naphthylacetic acid, and the like.

Suitable halo-, nitro-, hydroxy-, amino-, cyano-, thiocyano-, and lower-alkoxy-hydrocarbon carboxylic acids of not more than 12 carbon atoms include hydrocarbon carboxylic acids as illustrated above which contain one or more of halogen, nitro, hydroxy, amino, cyano, or thiocyano, or loweralkoxy, advantageously loweralkoxy of not more than six carbon atoms, for example, methoxy, ethoxy, propoxy, butoxy, amyloxy, hexyloxy, adn isomeric forms thereof. Examples of substituted hydrocarbon carboxylic acids falling within the above definition are the acyl radicals corresponding to shikimic acid, 5- and 6- bromo-2-methylcyclohexanecarboxylic acid, 4,5-dibromo-2-methylcyclohexanecarboxylic acid, 5,6 - dibromo - 2 - methylcyclohexanecarboxylic acid, 6-bromo-3-methylcyclohexanecarboxylic acid, 2,5-dibromo-1-methylcyclohexanecarboxylic acid, 2-bromo-4-methylcyclohexanecarboxylic acid, 1,2-dibromo-4-methylcyclohexanecarboxylic acid, 4-bromo-2,2,4-trimethylcyclopentane carboxylic acid, 1-bromo-3,5-dimethylcyclohexanecarboxylic acid, 4,4-dichlorobenzilic acid, cyanoacetic acid, thiocyano-acetic acids, cyanopropionic acid, lactic acid, glycine, ethoxyformic (ethyl hemicarbonic), and the like.

The tri-O-acylates of lincomycin are useful as intermediates for lincomycin mono-O and di-O-acylates which in turn are useful antibacterial agents. Lincomycin mono-O-acylates inhibit the growth of *Staphylococcus aureus* and, therefore, are useful as disinfectants on washed and stacked food utensils contaminated with this organism. Lincomycin di-O-acylates inhibit the growth of *Streptococcus viridans*, and therefore, are useful to inhibit this microorganism which has been found to be a contaminant on objects in dental offices, physicians offices and hospitals; they can also be administered in the feed or drinking water of laboratory animals, such as mice and rats, during shipment to act prophylactically in protecting them from *Streptococcus viridans* during shipment.

The following examples are illustrative of the process of the present invention but are not to be construed as limiting.

EXAMPLE 1

A. Lincomycin tetra-O-acetate hydrochloride

To a solution of 2 g. of lincomycin in 10 ml. of pyridine was added 3 ml. of acetic anhydride. The mixture was heated 6 hours on a steam bath, cooled to room temperature and stirred 1 hr. after the addition of 1 ml. of water. Removal of solvents left a thick syrup which was dissolved in 10 ml. of ethyl acetate and washed first with 10 ml. of ice-cold 5% aqueous sodium bicarbonate solution, then 3 times with 10 ml. portions of water. The solution was finally dried over anhydrous sodium sulfate and evaporated on a rotary evaporator to dryness. The residue was further dried overnight in a vacuum desiccator after which it was dissolved in 75 ml. of dry ether and, while cooling in ice, treated with dry hydrogen chloride until no further granular precipitate formed. The precipitate was immediately filtered, washed three times with 50 ml. portions of dry ether and dried in vacuo. The precipitate was dissolved in 30 ml. of chloroform which was evaporated to 8 ml. on a steam bath. To the warm solution was added about 50 ml. ether and crystallization resulted to yield lincomycin tetra-O-acetate·HCl having a melting point of 226–233° C.; and optical rotation $[\alpha]_D^{20} = +149°$ (c. 1 in $H_2O$); and the following elemental analysis:

Calculated for $C_{26}H_{42}N_2O_{10}S \cdot HCl \cdot \frac{1}{2}H_2O$: C, 50.35; H, 7.15; N, 4.52; O, 27.09; S, 5.17; Cl, 5.72; Eq. wt., 620; $H_2O$, 1.45; acetyl 27.8. Found: C, 49.83; H, 7.57; N, 4.52; O, 27.10; S, 4.99; Cl, 5.81; Eq. wt., 605; $H_2O$, 1.72; acetyl 25.53.

B. Lincomycin tri-O-acetate

A 5 gm. quantity of lincomycin tetra-O-acetate hydrochloride, Part A, was dissolved in a mixture of 50 ml. 1 N hydrochloric acid and 2 ml. ethanol and stored 4 hours at room temperature. The solution was adjusted to pH 8 with 6 N sodium hydroxide and extracted three times with 50 ml. of chloroform. The extract was washed with water, dried over magnesium sulfate, and evaporated to dryness, yielding 3.4 gm. of syrupy material. This material was distributed in a counter-current distribution system consisting of ethyl acetate:cyclohexane: 95% ethanol:water (27:23:30:20) for a total of 500 transfers. A peak fraction from tubes 300–345, $K=1.67$, was isolated by evaporation of the solvent and freeze-drying to yield 480 mg. of lincomycin tri-O-acetate.

Calculated for $C_{23}H_{40}N_2O_9S$: C, 54.12; H, 7.57; N, 5.26; S, 6.02. Found: C, 53.90; H, 7.90; N, 4.99; S, 5.94.

EXAMPLE 2

Lincomycin triacetate (1 g.) is placed in 50 ml. of 1 N hydrochloric acid and stored at room temperature for 5 hours. The solution is then brought to pH 8 with sodium bicarbonate and extracted exhaustively with 5 25-ml. volumes of methylene chloride. This solution is washed with water and dried over sodium sulfate. Following removal of the desiccant and evaporation of the solvent, the glassy residue is further dried under high vacuum and then subjected to counter-current distribution using the solvent system ethyl acetate, cyclohexane, 95% ethanol, water (2.7:2.3:3.0:2.0) for 500 transfers. Material of $K=0.266$ and $K=0.428$ is isolated. This is lincomycin monoacetate I and monoacetate II respectively. The material under the curve at $K=0.83$ is isolated. This is lincomycin diacetate.

I claim:

1. The process for the production of partial O-acylates of lincomycin which comprises subjecting the next higher O-acylate to acid hydrolysis with a dilute acid and at a temperature of about 15 to 50° C. until substantial conversion thereof to the desired partial O-acylate is obtained and isolating the partial O-acylate thus produced from the hydrolysate.

2. The process for the production of lincomycin tri-O-acylate which comprises subjecting lincomycin tetra-O-acylate to acid hydrolysis with a dilute acid and at a temperature of about 15 to 50° C. until substantial conversion of the lincomycin tetra-O-acylate to lincomycin tri-O-acylate is obtained and isolating lincomycin tri-O-acylate from the hydrolysate.

3. The process for the production of a partial-O-acylate of lincomycin which comprises treating the next higher O-acylate of lincomycin with an aqueous acid solution of from about 0.1 N to 1 N for about 1 to 5 hours and isolating the next lower O-acylate of lincomycin from the resulting solution.

4. The process for the production of lincomycin tri-O-acylate which comprises treating lincomycin tetra-O-acylate with an aqueous acid solution of from 0.1 N to 1 N for about 1 to 5 hours and isolating lincomycin tri-O-acylate from the resulting solution.

5. The process for the production of lincomycin tri-O-acetate which comprises hydrolyzing lincomycin tetra-O-acetate with 1 N hydrochloric acid for about 4 hours at room temperature and recovering the lincomycin tri-O-acetate so produced.

References Cited by the Examiner

UNITED STATES PATENTS 2,851,463  9/1958  Hinman _____ 260—210

LEWIS GOTTS, *Primary Examiner.*

ELBERT L. ROBERTS, *Examiner.*

JOHNNIE R. BROWN, *Assistant Examiner.*